US011480372B2

(12) United States Patent
Hammond et al.

(10) Patent No.: US 11,480,372 B2
(45) Date of Patent: *Oct. 25, 2022

(54) AIR CONDITIONING SYSTEM WITH VAPOR INJECTION COMPRESSOR

(71) Applicant: WaterFurnace International, Inc., Fort Wayne, IN (US)

(72) Inventors: Timothy A. Hammond, Harlan, IN (US); Robert R. Brown, Markle, IN (US)

(73) Assignee: WATERFURNACE INTERNATIONAL INC., Fort Wayne, IN (US)

(*) Notice: Subject to any disclaimer, the term of this patent is extended or adjusted under 35 U.S.C. 154(b) by 109 days.

This patent is subject to a terminal disclaimer.

(21) Appl. No.: 16/998,973

(22) Filed: Aug. 20, 2020

(65) Prior Publication Data

US 2020/0378667 A1 Dec. 3, 2020

Related U.S. Application Data

(63) Continuation of application No. 16/150,821, filed on Oct. 3, 2018, now Pat. No. 10,753,661, which is a
(Continued)

(51) Int. Cl.
*F25B 49/02* (2006.01)
*F25B 13/00* (2006.01)
*F25B 41/34* (2021.01)

(52) U.S. Cl.
CPC .............. *F25B 49/02* (2013.01); *F25B 13/00* (2013.01); *F25B 41/34* (2021.01);
(Continued)

(58) Field of Classification Search
CPC .................................. F25B 49/02; F25B 13/00
See application file for complete search history.

(56) References Cited

U.S. PATENT DOCUMENTS 3,460,353 A 8/1969 Ogata et al.
3,916,638 A 11/1975 Schmidt
(Continued)

FOREIGN PATENT DOCUMENTS

CA 1178268 11/1984
CN 1987397 A 6/2007
(Continued)

OTHER PUBLICATIONS

"134-XS and 134-S Series Compressors ECOnomizer (EA-12-03-E)," 134-XS and 134-S series—Application and Maintenance Manual, Technical report EA1203E, RefComp Refrigerant Compressors, undated but believed to be publicly available at least as early as Mar. 2014 (4 pages).
(Continued)

*Primary Examiner* — Henry T Crenshaw
(74) *Attorney, Agent, or Firm* — Neal, Gerber & Eisenberg LLP; Thomas E. Williams

(57) ABSTRACT

An air conditioning system can be toggled between a heating mode, in which heat is withdrawn from a source (e.g., a geothermal source) and deposited into a conditioned space (e.g., a building), and a cooling mode, in which heat is withdrawn from the conditioned space and deposited into the source. The air conditioning system uses a combination of efficiency-enhancing technologies, including injection of superheated vapor into the system's compressor from an economizer circuit, adjustable compressor speed, the use of one or coaxial heat exchangers and the use of electronic expansion valves that are continuously adjustable from a fully closed to various open positions. A controller may be used to control the system for optimal performance in both the heating and cooling modes, such as by disabling the economizer circuit and vapor injection when the system is in the cooling mode.

21 Claims, 6 Drawing Sheets

Related U.S. Application Data continuation of application No. 14/862,762, filed on Sep. 23, 2015, now Pat. No. 10,119,738.

(60) Provisional application No. 62/056,082, filed on Sep. 26, 2014.

(52) U.S. Cl.
CPC ... *F25B 2313/003* (2013.01); *F25B 2313/004* (2013.01); *F25B 2313/0292* (2013.01); *F25B 2313/0311* (2013.01); *F25B 2600/0253* (2013.01); *F25B 2600/2509* (2013.01); *F25B 2600/2513* (2013.01); *Y02B 30/70* (2013.01)

(56) References Cited

U.S. PATENT DOCUMENTS

| | | |
|---|---|---|
| 3,938,352 A | 2/1976 | Schmidt |
| 4,072,187 A | 2/1978 | Lodge |
| 4,173,865 A | 11/1979 | Sawyer |
| 4,179,894 A | 12/1979 | Hughes |
| 4,299,098 A | 11/1981 | Derosier |
| 4,399,664 A | 8/1983 | Derosier |
| 4,441,901 A | 4/1984 | Endoh |
| 4,493,193 A | 1/1985 | Fisher |
| 4,528,822 A | 7/1985 | Glamm |
| 4,538,418 A | 9/1985 | Lawrence et al. |
| 4,575,001 A | 3/1986 | Oskarsson et al. |
| 4,592,206 A | 6/1986 | Yamazaki et al. |
| 4,598,557 A | 7/1986 | Robinson et al. |
| 4,645,908 A | 2/1987 | Jones |
| 4,646,538 A | 3/1987 | Blackshaw et al. |
| 4,685,307 A | 8/1987 | Jones |
| 4,693,089 A | 9/1987 | Bourne et al. |
| 4,698,978 A | 10/1987 | Jones |
| 4,727,727 A | 3/1988 | Reedy |
| 4,766,734 A | 8/1988 | Dudley |
| 4,776,180 A | 10/1988 | Patton et al. |
| 4,796,437 A | 1/1989 | James |
| 4,798,059 A | 1/1989 | Morita |
| 4,799,363 A | 1/1989 | Nakamura |
| 4,835,976 A | 6/1989 | Torrence |
| 4,856,578 A | 8/1989 | McCahill |
| 4,893,476 A | 1/1990 | Bos et al. |
| 4,909,041 A | 3/1990 | Jones |
| 4,920,757 A | 5/1990 | Gazes et al. |
| 4,924,681 A | 5/1990 | De Vit et al. |
| 4,938,032 A | 7/1990 | Mudford |
| 5,038,580 A | 8/1991 | Hart |
| 5,044,425 A | 9/1991 | Tatsumi et al. |
| 5,081,848 A | 1/1992 | Rawlings et al. |
| 5,088,296 A | 2/1992 | Hamaoka |
| 5,099,651 A | 3/1992 | Fischer |
| 5,105,629 A | 4/1992 | Parris et al. |
| 5,136,855 A | 8/1992 | Lenarduzzi |
| 5,172,564 A | 12/1992 | Reedy |
| 5,187,944 A | 2/1993 | Jarosch |
| 5,224,357 A | 7/1993 | Galiyano et al. |
| 5,269,153 A | 12/1993 | Cawley |
| 5,305,822 A | 4/1994 | Kogetsu et al. |
| 5,309,732 A | 5/1994 | Sami |
| 5,323,844 A | 6/1994 | Sumitani et al. |
| 5,339,890 A | 8/1994 | Rawlings |
| 5,355,688 A | 10/1994 | Rafalovich et al. |
| 5,372,016 A | 12/1994 | Rawlings |
| 5,438,846 A | 8/1995 | Datta |
| 5,461,876 A | 10/1995 | Dressler |
| 5,465,588 A | 11/1995 | McCahill et al. |
| 5,477,914 A | 12/1995 | Rawlings |
| 5,497,629 A | 3/1996 | Rafalovich et al. |
| 5,507,337 A | 4/1996 | Rafalovich et al. |
| 5,533,355 A | 7/1996 | Rawlings |
| 5,564,282 A | 10/1996 | Kaye |
| 5,613,372 A | 3/1997 | Beal et al. |
| 5,619,864 A | 4/1997 | Reedy |
| 5,628,200 A | 5/1997 | Pendergrass |
| 5,651,265 A | 7/1997 | Grenier |
| 5,669,224 A | 9/1997 | Lenarduzzi |
| 5,689,966 A | 11/1997 | Zess et al. |
| 5,729,985 A | 3/1998 | Yoshihara et al. |
| 5,758,514 A | 6/1998 | Genung et al. |
| 5,802,864 A | 9/1998 | Yarbrough et al. |
| 5,927,088 A | 7/1999 | Shaw |
| 6,032,472 A | 3/2000 | Heinrichs et al. |
| 6,070,423 A | 6/2000 | Hebert |
| 6,082,125 A | 7/2000 | Savtchenko |
| 6,123,147 A | 9/2000 | Pittman |
| 6,149,066 A | 11/2000 | Perry et al. |
| 6,167,715 B1 | 1/2001 | Hebert |
| 6,212,892 B1 | 4/2001 | Rafalovich |
| 6,227,003 B1 | 5/2001 | Smolinsky |
| 6,253,564 B1 | 7/2001 | Yarbrough et al. |
| 6,347,527 B1 | 2/2002 | Bailey et al. |
| 6,385,983 B1 | 5/2002 | Sakki et al. |
| 6,418,745 B1 | 7/2002 | Ratliff |
| 6,434,960 B1 | 8/2002 | Rousseau |
| 6,474,087 B1 | 11/2002 | Lifson |
| 6,536,221 B2 | 3/2003 | James |
| 6,655,164 B2 | 12/2003 | Rogstam |
| 6,662,864 B2 | 12/2003 | Burk et al. |
| 6,668,572 B1 | 12/2003 | Seo et al. |
| 6,694,750 B1 | 2/2004 | Lifson et al. |
| 6,729,151 B1 | 5/2004 | Thompson |
| 6,751,972 B1 | 6/2004 | Jungwirth |
| 6,804,975 B2 | 10/2004 | Park |
| 6,817,205 B1 | 11/2004 | Lifson et al. |
| 6,826,921 B1 | 12/2004 | Uselton |
| 6,857,285 B2 | 2/2005 | Hebert |
| 6,892,553 B1 | 5/2005 | Lifson et al. |
| 6,915,656 B2 | 7/2005 | Ratliff |
| 6,931,879 B1 | 8/2005 | Wiggs |
| 6,938,438 B2 | 9/2005 | Lifson et al. |
| 6,941,770 B1 | 9/2005 | Taras et al. |
| 7,000,423 B2 | 2/2006 | Lifson et al. |
| 7,059,151 B2 | 6/2006 | Taras et al. |
| 7,114,349 B2 | 10/2006 | Lifson et al. |
| 7,150,160 B2 | 12/2006 | Herbert |
| 7,155,922 B2 | 1/2007 | Harmon et al. |
| 7,185,505 B2 | 3/2007 | Kamimura |
| RE39,597 E | 5/2007 | Rousseau |
| 7,210,303 B2 | 5/2007 | Zhang et al. |
| 7,228,707 B2 | 6/2007 | Lifson et al. |
| 7,234,311 B2 | 6/2007 | Lifson et al. |
| 7,254,955 B2 | 8/2007 | Otake et al. |
| 7,263,848 B2 | 9/2007 | Bhatti |
| 7,272,948 B2 | 9/2007 | Taras et al. |
| 7,275,385 B2 | 10/2007 | Abel et al. |
| 7,325,414 B2 | 2/2008 | Taras et al. |
| 7,454,919 B2 | 11/2008 | Ookoshi et al. |
| 7,484,374 B2 | 2/2009 | Pham et al. |
| 7,617,697 B2 | 11/2009 | McCaughan |
| 7,654,104 B2 | 2/2010 | Groll et al. |
| 7,716,943 B2 | 5/2010 | Seefeldt |
| 7,770,405 B1 | 8/2010 | Dillon |
| 7,823,404 B2 | 11/2010 | Hanson |
| 7,845,190 B2 | 12/2010 | Pearson |
| 7,854,137 B2 | 12/2010 | Lifson et al. |
| 7,856,834 B2 | 12/2010 | Haley |
| 7,913,501 B2 | 3/2011 | Ellis et al. |
| 7,937,960 B2 | 5/2011 | Matsui |
| 7,958,737 B2 | 6/2011 | Lifson et al. |
| 7,975,495 B2 | 7/2011 | Voorhis et al. |
| 7,975,506 B2 | 7/2011 | James et al. |
| 7,997,092 B2 | 8/2011 | Lifson et al. |
| 8,037,713 B2 | 10/2011 | Haley et al. |
| 8,074,459 B2 | 12/2011 | Murakami et al. |
| 8,079,228 B2 | 12/2011 | Lifson et al. |
| 8,079,229 B2 | 12/2011 | Lifson et al. |
| 8,082,751 B2 | 12/2011 | Wiggs |
| 8,136,364 B2 | 3/2012 | Lifson et al. |
| 8,191,376 B2 | 6/2012 | Fox et al. |
| 8,220,531 B2 | 7/2012 | Murakami et al. |
| 8,286,438 B2 | 10/2012 | McCahill |
| 8,418,482 B2 | 4/2013 | Bush et al. |

(56) References Cited

U.S. PATENT DOCUMENTS

| | | |
|---|---|---|
| 8,418,486 B2 | 4/2013 | Taras et al. |
| 8,424,326 B2 | 4/2013 | Mitra et al. |
| 8,459,052 B2 | 6/2013 | Bush et al. |
| 8,528,359 B2 | 9/2013 | Lifson et al. |
| 8,561,425 B2 | 10/2013 | Mitra et al. |
| 8,650,893 B2 | 2/2014 | Hanson |
| 8,733,429 B2 | 5/2014 | Harrison et al. |
| 8,756,943 B2 | 6/2014 | Chen et al. |
| 8,769,982 B2 | 7/2014 | Ignatiev et al. |
| 8,984,903 B2 | 3/2015 | Itoh et al. |
| 9,052,125 B1 | 6/2015 | Dostal |
| 9,562,700 B2 | 2/2017 | Watanabe |
| 10,072,856 B1 | 9/2018 | Akin et al. |
| 10,118,462 B2 | 11/2018 | Kohigashi et al. |
| 10,119,738 B2 | 11/2018 | Hammond et al. |
| 10,345,004 B1 | 7/2019 | Hern et al. |
| 10,753,661 B2 | 8/2020 | Hammond et al. |
| 10,866,002 B2 | 12/2020 | Taras et al. |
| 10,871,314 B2 | 12/2020 | Taras et al. |
| 10,935,260 B2 | 3/2021 | Taras et al. |
| 2003/0061822 A1 | 4/2003 | Rafalovich |
| 2003/0221436 A1 | 12/2003 | Xu |
| 2003/0221445 A1 | 12/2003 | Smolinsky |
| 2006/0010908 A1 | 1/2006 | Taras et al. |
| 2006/0218949 A1 | 10/2006 | Ellis et al. |
| 2006/0225445 A1 | 10/2006 | Lifson et al. |
| 2007/0074536 A1 | 4/2007 | Bai |
| 2007/0289319 A1 | 12/2007 | Kim et al. |
| 2007/0295477 A1 | 12/2007 | Mueller et al. |
| 2008/0016895 A1 | 1/2008 | Kim et al. |
| 2008/0041072 A1 | 2/2008 | Seefeldt |
| 2008/0173034 A1 | 7/2008 | Shaw |
| 2008/0196418 A1 | 8/2008 | Lifson et al. |
| 2008/0197206 A1 | 8/2008 | Murakami et al. |
| 2008/0209930 A1* | 9/2008 | Taras ............... F25B 13/00 62/228.1 |
| 2008/0256975 A1 | 10/2008 | Lifson et al. |
| 2008/0282718 A1 | 11/2008 | Beagle |
| 2008/0296396 A1 | 12/2008 | Corroy et al. |
| 2008/0302113 A1 | 12/2008 | Yin et al. |
| 2008/0302118 A1 | 12/2008 | Chen et al. |
| 2008/0302129 A1 | 12/2008 | Mosemann et al. |
| 2008/0307813 A1 | 12/2008 | Lifson et al. |
| 2009/0000611 A1 | 1/2009 | Kaiser |
| 2009/0107656 A1 | 4/2009 | Marois |
| 2009/0208331 A1 | 8/2009 | Haley et al. |
| 2009/0294097 A1 | 12/2009 | Rini et al. |
| 2009/0314014 A1 | 12/2009 | Ericsson |
| 2010/0005821 A1 | 1/2010 | McCahill |
| 2010/0005831 A1 | 1/2010 | Vaisman et al. |
| 2010/0024470 A1 | 2/2010 | Lifson et al. |
| 2010/0058781 A1 | 3/2010 | Lifson et al. |
| 2010/0064710 A1 | 3/2010 | Slaughter |
| 2010/0064722 A1 | 3/2010 | Taras |
| 2010/0077788 A1 | 4/2010 | Lewis |
| 2010/0114384 A1 | 5/2010 | Maxwell |
| 2010/0132399 A1 | 6/2010 | Mitra et al. |
| 2010/0199715 A1 | 8/2010 | Lifson et al. |
| 2010/0251750 A1 | 10/2010 | Lifson et al. |
| 2010/0281894 A1 | 11/2010 | Huff |
| 2010/0287969 A1 | 11/2010 | Ueda et al. |
| 2010/0326100 A1 | 12/2010 | Taras et al. |
| 2011/0023515 A1* | 2/2011 | Kopko ............... F25B 49/022 165/181 |
| 2011/0036119 A1 | 2/2011 | Fujimoto et al. |
| 2011/0041523 A1 | 2/2011 | Taras et al. |
| 2011/0061413 A1 | 3/2011 | Setoguchi |
| 2011/0079032 A1 | 4/2011 | Taras et al. |
| 2011/0088426 A1 | 4/2011 | Lochtefeld |
| 2011/0094248 A1 | 4/2011 | Taras et al. |
| 2011/0094259 A1 | 4/2011 | Lifson et al. |
| 2011/0132007 A1 | 6/2011 | Weyna et al. |
| 2011/0174014 A1 | 7/2011 | Scarcella et al. |
| 2011/0203299 A1 | 8/2011 | Jing et al. |
| 2011/0209490 A1 | 9/2011 | Mijanovic et al. |
| 2011/0259025 A1 | 10/2011 | Noh et al. |
| 2011/0289950 A1 | 12/2011 | Kim et al. |
| 2011/0289952 A1 | 12/2011 | Kim et al. |
| 2012/0011866 A1 | 1/2012 | Scarcella et al. |
| 2012/0067965 A1 | 3/2012 | Rajasekaran et al. |
| 2012/0103005 A1* | 5/2012 | Kopko ............... F25B 1/047 62/430 |
| 2012/0198867 A1 | 8/2012 | Ng et al. |
| 2012/0205077 A1 | 8/2012 | Zinger et al. |
| 2012/0247134 A1 | 10/2012 | Gurin |
| 2012/0291460 A1 | 11/2012 | Aoyagi |
| 2013/0014451 A1 | 1/2013 | Russell et al. |
| 2013/0031934 A1 | 2/2013 | Huff et al. |
| 2013/0098085 A1 | 4/2013 | Judge et al. |
| 2013/0104574 A1 | 5/2013 | Dempsey et al. |
| 2013/0180266 A1 | 7/2013 | Bois |
| 2013/0269378 A1 | 10/2013 | Wong |
| 2013/0305756 A1 | 11/2013 | Gomes et al. |
| 2014/0013782 A1* | 1/2014 | Kopko ............... A63B 57/00 62/126 |
| 2014/0013788 A1* | 1/2014 | Kopko ............... F25B 30/02 62/324.6 |
| 2014/0033753 A1 | 2/2014 | Lu et al. |
| 2014/0033755 A1 | 2/2014 | Wong |
| 2014/0053585 A1 | 2/2014 | Huff |
| 2014/0060101 A1 | 3/2014 | Styles et al. |
| 2014/0123689 A1 | 5/2014 | Ellis et al. |
| 2014/0245770 A1 | 9/2014 | Chen et al. |
| 2014/0260392 A1 | 9/2014 | Hawkins et al. |
| 2015/0052937 A1 | 2/2015 | Hung |
| 2015/0059373 A1 | 3/2015 | Maiello et al. |
| 2015/0204586 A1 | 7/2015 | Burg et al. |
| 2015/0285539 A1* | 10/2015 | Kopko ............... F25B 41/24 62/324.1 |
| 2017/0010029 A9 | 1/2017 | Reytblat et al. |
| 2017/0227250 A1 | 8/2017 | Karamanos |
| 2018/0010829 A1 | 1/2018 | Taras et al. |
| 2018/0128506 A1 | 5/2018 | Taras et al. |
| 2018/0313555 A1 | 11/2018 | Henderson |
| 2019/0032981 A1 | 1/2019 | Hammond et al. |
| 2019/0178509 A1 | 6/2019 | Taras et al. |
| 2020/0072510 A1 | 3/2020 | Brown |
| 2020/0378667 A1* | 12/2020 | Hammond ............ F25B 13/00 |
| 2021/0018234 A1 | 1/2021 | Lingrey et al. |
| 2021/0095872 A1 | 4/2021 | Taras et al. |
| 2021/0131709 A1 | 5/2021 | Taras et al. |
| 2021/0180807 A1 | 6/2021 | Taras et al. |

FOREIGN PATENT DOCUMENTS

| | | |
|---|---|---|
| CN | 201944952 U | 8/2011 |
| CN | 102353126 A | 2/2012 |
| CN | 203231582 U | 10/2013 |
| CN | 103471275 A | 12/2013 |
| CN | 203396155 U | 1/2014 |
| CN | 203432025 U | 2/2014 |
| EP | 134015 | 3/1985 |
| EP | 1983275 A1 | 10/2008 |
| JP | 2000046417 | 2/2000 |
| JP | 2000274786 | 10/2000 |
| JP | 2000314563 | 11/2000 |
| JP | 2001248931 | 9/2001 |
| KR | 100963221 B1 | 6/2010 |
| WO | 9600370 | 1/1996 |
| WO | 2001/90663 | 11/2001 |
| WO | 2006/033782 | 3/2006 |
| WO | 2008/045086 | 4/2008 |
| WO | 2008/048252 | 4/2008 |
| WO | 2010/005918 | 1/2010 |
| WO | 2010/054498 | 5/2010 |
| WO | 2010/104709 | 9/2010 |
| WO | 2013/142760 | 9/2013 |

(56) References Cited

FOREIGN PATENT DOCUMENTS

WO    2014/031559 A1    2/2014
WO    2014/031708 A1    2/2014

OTHER PUBLICATIONS

"Economized Vapor Injection (EVI) Compressors," Emerson Climate Technologies Application Engineering Bulletin AE4-1327 R2, Revised Sep. 2006 (9 pages).
"Enhanced Vapour Injection (EVI) for ZH*KVE Scroll Compressors," Emerson Climate Technologies—Technical Information, C7.4.3/1107-0512/E, May 2012 (10 pages).
"Heat Pump Mechanics" http://www.geo4va.vt.edu/A3/A3.htm#A3sec3c (Accessed Apr. 20, 2011) (19 pages).
"Heat pumps in residential and commercial buildings" http://www.heatpumpcentre.org/en/aboutheatpumps/heatpumpsinresidential/Sidor/default.aspx (Accessed Apr. 20, 2011) (2 pages).
B.P. Rasmussen et al., "Model-Driven System Identification of Transcritical Vapor Compression Systems," IEEE Transactions on Control Systems Technology, May 2005, pp. 444-451, vol. 13 (8 pages).
Ekaterina Vi Nogradova, "Economizers in Chiller Systems," Bachelor's Thesis, Mikkelin Ammattikorkeakoulu, Nov. 2012 (50 pages).
Haraldsson et al., "Measurement of Performance and Evaluation of a Heat Pump—with Scroll Compressor EVI and Economizer," Lunds Institute of Technology, 2006 (4 pages).
Honeywell, VFF1, VFF2, VFF3, VFF6 Resilient Seat Butterfly Valves with Flanged Connections Jan. 2013, p. 1, 1st column, last paragraph. (Year: 2013) (20 pages).
International Preliminary Report on Patentability issued in International Application No. PCT/US2013/033433 dated Sep. 23, 2014 (7 Pages).
International Search Report and Written Opinion issued in International Application No. PCT/US2013/033433 dated Aug. 9, 2013 (11 Pages).
John P. Elson et al., "Scroll Technology: An Overview of Past, Present and Future Developments," International Compressor Engineering Conference, 2008, Paper 1871 (9 pages).
Korean Intellectual Property Office, International Search Report in International Application No. PCT/US2009/049734 (dated Jan. 20, 2010) (2 pages).
Korean Intellectual Property Office, International Search Report in International Application No. PCT/US2010/026010 (dated Sep. 28, 2010) (2 pages).
Lund et al., "Geothermal (Ground-Source Heat Pumps—A World Overview," GHC Bulletin, Sep. 2004 (edited and updated version of the article from Renewal Energy World, (Jul.-Aug. 2003), vol. 6 No. 4) (10 pages).
Michael F. Taras, "Reheat Which Concept is Best," ASHRAE Journal: 35-40 (Dec. 2004) (7 pages).
Murphy et al., "Air-Source Integrated Heat Pump for Net-Zero-Energy Houses Technology Status Report," *Oak Ridge National Laboratory*, ORNL-TM-2007-112 (Jul. 2007) (93 pages).
Murphy et al., "Ground-Source Integrated Heat Pump for Net-Zero-Energy Houses Technology Status Report," *Oak Ridge National Laboratory*, ORNL-TM-2007-177 (Dec. 2007) (78 pages).
Third Party Submission dated Nov. 10, 2014 filed in U.S. Appl. No. 13/848,342 (13 Pages).
Tolga N. Aynur, "Variable Refrigerant Flow Systems: A Review, Energy and Buildings," Jan. 2010, pp. 1106-1112, vol. 42 (7 pages).
Wei Yang et al., "The Design Method of U-Bend Geothermal Heat Exchanger of DX-GCHP in Cooling Model," IEEE, 2011, pp. 3635-3637 (English Abstract) (3 pages).

\* cited by examiner

AIR CONDITIONING SYSTEM WITH VAPOR INJECTION COMPRESSOR

CROSS REFERENCE TO RELATED APPLICATIONS

This application is a continuation of U.S. application Ser. No. 16/150,821, filed on Oct. 3, 2018, which is continuation of U.S. application Ser. No. 14/862,762, now U.S. Pat. No. 10,119,738, which was filed on Sep. 23, 2015, which claims the benefit of and priority to U.S. Provisional Patent Application No. 62/056,082 filed on Sep. 26, 2014 entitled AIR CONDITIONING SYSTEM WITH VAPOR INJECTION COMPRESSOR. These applications are incorporated by reference herein in their entirety.

BACKGROUND

1. Technical Field

The present disclosure relates to air conditioning systems and, in particular, to efficient-enhanced reversible air conditioning systems capable of both heating and refrigeration.

2. Description of The Related Art

Heating and cooling systems may include a compressor for compressing a working refrigerant fluid, a condenser heat exchanger for extracting heat from the refrigerant fluid, an expansion valve, and an evaporator heat exchanger for extracting heat from an external source. In some instances, such refrigeration systems may further include an economizer heat exchanger and/or a vapor injection feature associated with the compressor for increasing both the capacity and the efficiency of the compressor.

In typical refrigeration systems, the refrigerant is a high pressure hot liquid upon leaving the compressor, is a high pressure warm liquid downstream of the condenser, is a low pressure warm gas downstream of the expansion valve, and is a low pressure cool gas downstream of the evaporator.

An economizer may be used to further influence the thermal state of the refrigerant between the condenser and evaporator. An auxiliary refrigerant flow is tapped from the main refrigerant flow downstream of the economizer heat exchanger and passed through an expansion valve to expand the auxiliary refrigerant flow before same is passed back through the economizer heat exchanger in heat exchange relation with the main refrigerant flow. This serves to further subcool the main refrigerant flow upstream of the evaporator.

The economizer heat exchanger also discharges an auxiliary refrigerant flow in the form of an intermediate pressure vapor, which is then injected into the compressor. Typically a scroll compressor is used in connection with such a system, and the vapor is injected at an intermediate pressure location within the wraps of the scroll compressor.

Further increases in efficiency and capacity are desirable in air conditioning systems, in order to increase system efficacy and/or decrease the cost of operating the system.

SUMMARY

The present disclosure provides an air conditioning system which can be toggled between a heating mode, in which heat is withdrawn from a source (e.g., a geothermal source) and deposited into a conditioned space (e.g., a building), and a cooling mode, in which heat is withdrawn from the conditioned space and deposited into the source. The air conditioning system uses a combination of efficiency-enhancing technologies, including injection of superheated vapor into the system's compressor from an economizer circuit, adjustable compressor speed, the use of one or more coaxial heat exchangers and the use of electronic expansion valves that are continuously adjustable from a fully closed to various open positions. A controller may be used to control the system for optimal performance in both the heating and cooling modes, such as by disabling the economizer circuit and vapor injection when the system is in the cooling mode.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
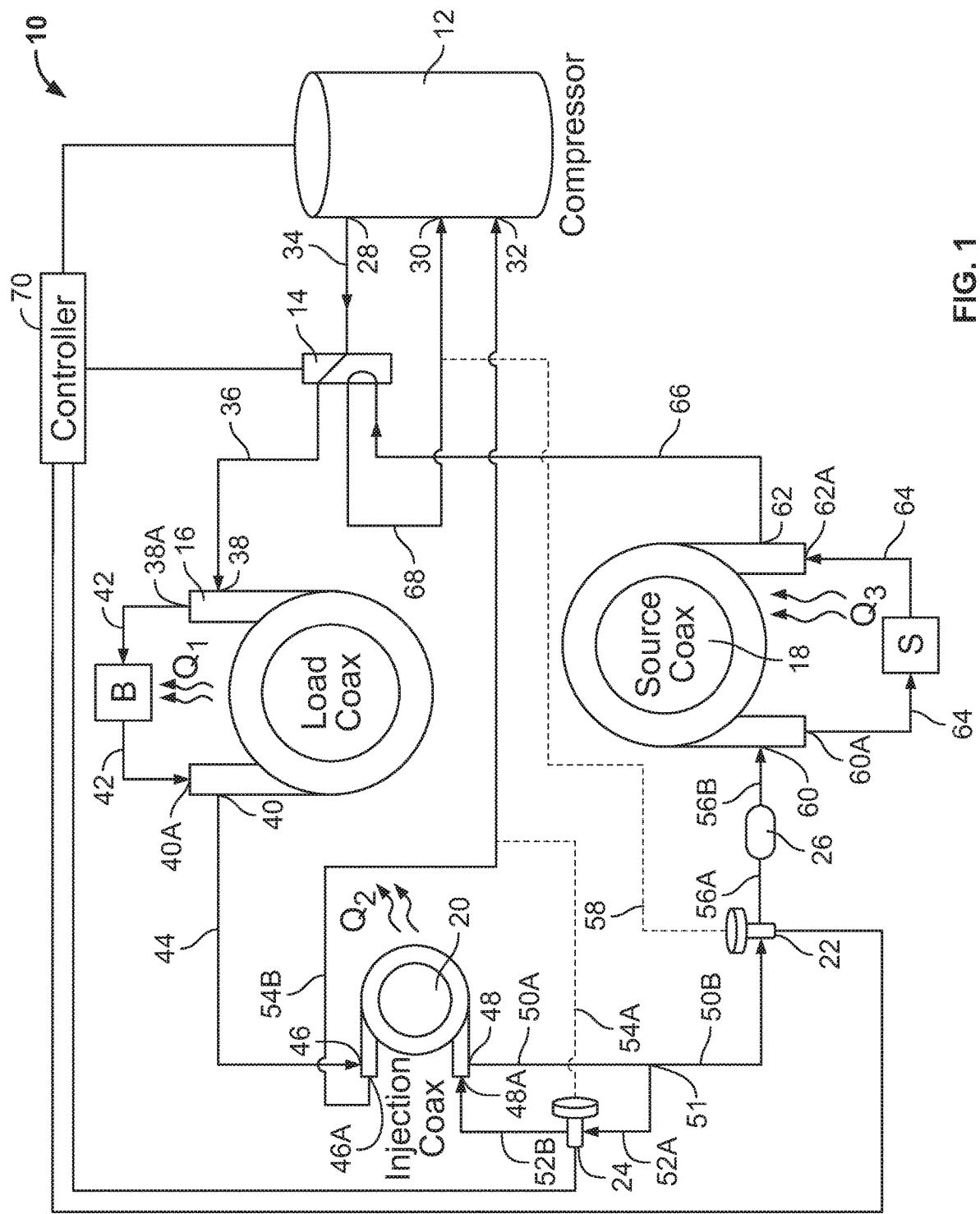
FIG. 1 is a schematic illustration of an air conditioning system in accordance with the present disclosure, illustrating refrigerant flow in a heating mode.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise form disclosed.

DETAILED DESCRIPTION

For purposes of the present disclosure, "air conditioning" refers to both heating and cooling a conditioned space (e.g., the inside of a building). In particular and as described in detail below, an air conditioning system may be reversible to cool a conditioned space while exhausting heat to a source (e.g., a geothermal source), or to heat a conditioned space by extracting heat from the source.

For purposes of the present disclosure, "superheated vapor" refers to a vapor whose temperature is measurably above its liquid/vapor phase change temperature for a given vapor pressure.

For purposes of the present disclosure, "subcooled liquid" refers to a liquid whose temperature is measurably below its liquid/vapor phase change temperature for a given ambient vapor pressure.

For purposes of the present disclosure, "vapor mixture" refers to mixed liquid-and-vapor phase fluid in which the fluid can undergo phase changes (i.e., from liquid to saturated vapor or from saturated vapor to liquid) at constant pressure and temperature.

Figure 2:
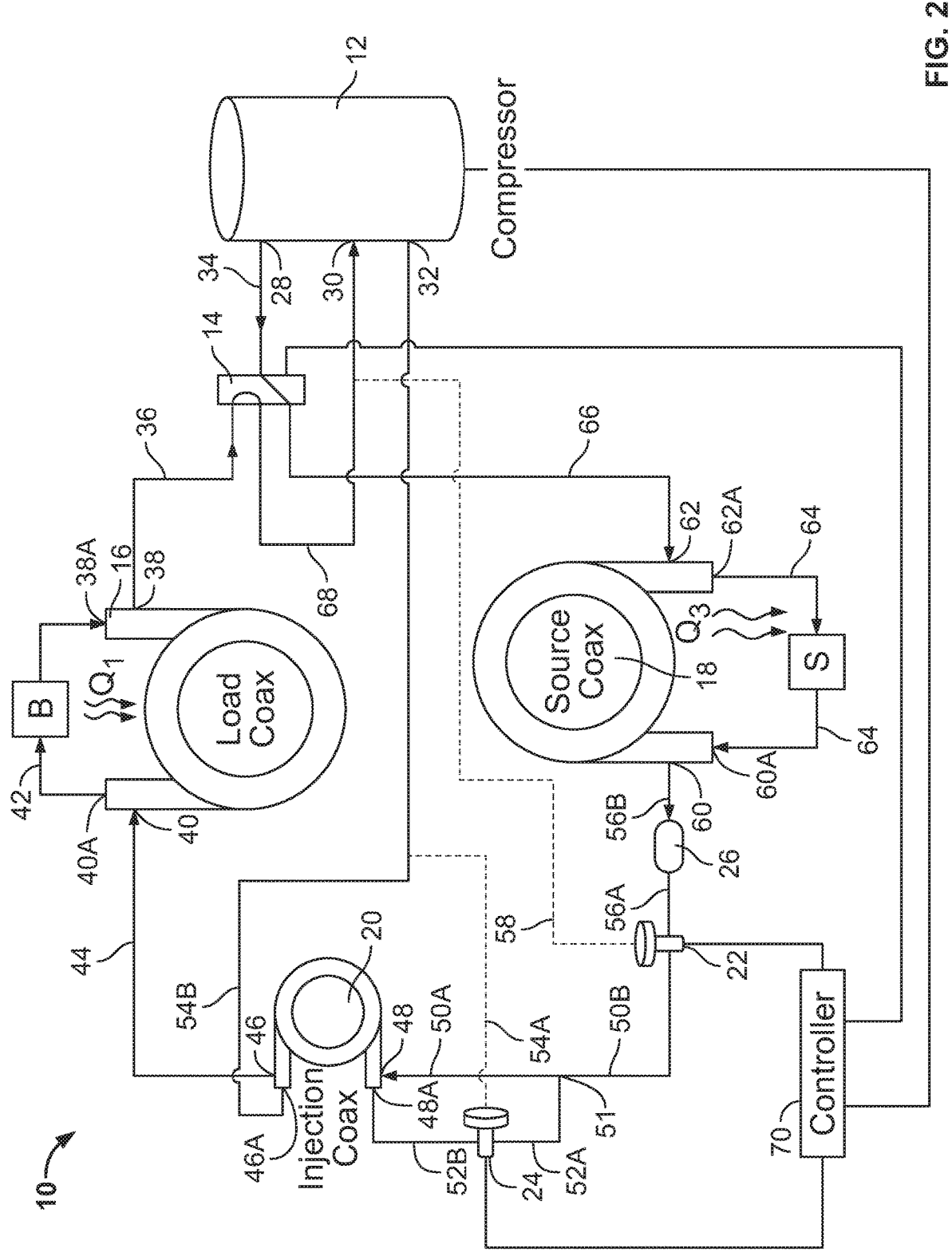
FIG. 2 is another schematic illustration of the air conditioning system shown in FIG. 1, with refrigerant flow reversed for a cooling mode.

Referring generally to FIGS. 1 and 2, the present disclosure provides air conditioning system 10 which is reconfigurable between a heating mode (FIG. 1) and a cooling mode (FIG. 2). Such reconfiguration may be accomplished by actuation of a four way reversing valve 14, which reverses the direction of refrigerant flow among the various components of system 10, thereby reversing the flow of heat to and from a source S (e.g., a geothermal source) and a load B (e.g., the interior of a building or other thermally conditioned space). System 10 may further include an economizer heat exchanger 20 which enables a vapor injection feature to enhance the efficiency and function of the compressor 12 in the heating mode, but may not be needed in the cooling mode. As described in detail below, the toggling of reversing valve 14 from the heating mode to the cooling mode may be accompanied by adjusting an economizer expansion valve 24 to cease refrigerant flow therethrough, effectively disabling the vapor injection in the cooling mode.

Regardless of whether air conditioning system 10 is utilized for heating or cooling a conditioned space, the same set of components all remain disposed in the system flow path, the specific functions of which are discussed in detail below. System 10 includes compressor 12 fluidly connected to load heat exchanger 16 and source heat exchanger 18 via reversing valve 14. Operably interposed between load heat exchanger 16 and source heat exchanger 18 is economizer heat exchanger 20. Primary expansion valve 22 is operably interposed between economizer 20 and source heat exchanger 18, while economizer expansion valve 24 selectively receives a portion of the refrigerant flow and discharges to economizer 20 in the heating mode. In the cooling mode of FIG. 2, economizer expansion valve 24 prevents one of the two flows of refrigerant through economizer heat exchanger 20, effectively nullifying the effect of economizer 20 on the thermal characteristics of air conditioning system 10, as also described in detail below.

1. Reversible Heating and Cooling

Air conditioning system 10 is configured as a reversible heat pump. In a heating mode, refrigerant flow through system 10 sends hot refrigerant through load heat exchanger 16, which operates as a condenser depositing heat $Q_1$ into a conditioned space B, while cold refrigerant is sent through a source heat exchanger 18 which operates as an evaporator to withdraws heat $Q_3$ from a source S, e.g., a geothermal source. In a cooling mode, the roles of load and source heat exchangers 16, 18 are reversed, as described further below such that load heat exchanger 16 operates as an evaporator and source heat exchanger 18 operates as a condenser.

FIG. 1 illustrates air conditioning system 10 in the heating mode. Compressor 12 receives refrigerant in a low-pressure superheated vapor phase at compressor inlet 30 and vapor injection inlet 32, as described below, and compresses this refrigerant vapor into a high pressure, superheated vapor phase thereby increasing the temperature, enthalpy and pressure of the refrigerant. This hot vapor phase refrigerant discharges at compressor outlet 28 into fluid line 34, which conveys the vapor to reversing valve 14. Valve 14 passes this superheated vapor to fluid line 36, which conveys the vapor to the compressor-side port 38 of load heat exchanger 16.

Load heat exchanger 16 is in thermal communication with a conditioned space B, which may be a residence or other building, for example, and operates to exchange heat $Q_1$ between the refrigerant and a working fluid and thereby send heat $Q_1$ to conditioned space B. In particular, the superheated refrigerant vapor received at port 38 discharges heat $Q_1$ to a relatively cooler working fluid circulating through working fluid lines 42 between building B and load heat exchanger 16. The heated working fluid exits at crossflow outlet 38A of load heat exchanger 16, carrying heat $Q_1$ which is subsequently deposited in building B. For example, building B may have a radiant heat system which extracts heat $Q_1$ from the working fluid and then sends cooled fluid back to crossflow inlet 40A of load heat exchanger 16, where the working fluid is again allowed to circulate through heat exchanger 16 to absorb heat $Q_1$ from the hot refrigerant vapor. Other heating systems for building B may be used in accordance with the present disclosure, such as forced-air heating systems or any other suitable heat transfer arrangement. Moreover, the refrigerant may transfer heat to a circulating working fluid which deposits heat in building B, or warmed working fluid may itself be deposited into building B directly, such as hot water being directed into a hot water heater for consumption in building B, direct refrigerant-to-air heat transfer (e.g., by blowing air over hot heat exchanger coils into building B), and the like.

The removal of heat $Q_1$ from the refrigerant as it passes through load heat exchanger 16 effects a phase change from superheated vapor (at the compressor-side port 38) to a partially subcooled liquid (at economizer-side port 40), which is discharged to fluid line 44 and conveyed to the load-side port 46 of economizer heat exchanger 20. The refrigerant flows through heat exchanger 20, which removes heat $Q_2$ therefrom as described below. Upon discharge from economizer heat exchanger 20 at the source-side port 48, the full volume of refrigerant flow passes through fluid line 50A to fluid divider 51, where a main flow of refrigerant continues toward source heat exchanger 18 via fluid line 50B, while a portion of the refrigerant is diverted into fluid line 52A and flows toward economizer expansion valve 24.

At expansion valve 24, subcooled liquid refrigerant is allowed to expand into a low-pressure, cool liquid- and vapor mixed-phase state. Pressure sensing line 54A is fluidly connected to expansion valve 24, such that the pressure within valve 24 can be monitored remotely, e.g., by controller 70 (further described below). The low-pressure, mixed-phase refrigerant discharged from valve 24 is transmitted through fluid line 52B to a crossflow inlet 48A of economizer 20 where it circulates in heat-transfer relationship with the main refrigerant flow until reaching crossflow outlet 46A. During this circulation, heat $Q_2$ transfers from the warmer main flow of liquid refrigerant passing from port 46 to port 48 to the low-pressure flow of the economizer portion of refrigerant, such that the refrigerant is warmed to a low-pressure superheated vapor by the time it discharges at outlet 46A. This superheated vapor is carried by vapor injection fluid line 54B to vapor injection inlet 32 of compressor 12.

The transfer of heat $Q_2$ also serves to further lower the temperature of the subcooled liquid phase refrigerant exiting the source-side port 48, as compared to the liquid phase refrigerant entering at the load-side port 46. As noted above, a main flow of this lower-temperature subcooled liquid phase refrigerant passes divider 51 and flows through fluid line 50B to primary expansion valve 22. In valve 22, the sub-cooled liquid is allowed to expand into a low-pressure, cold, mixed liquid/vapor phase. This cold fluid is conveyed via fluid line 56A to a filter/dryer 26, which separates entrained liquid from the vapor and discharges the cold liquid and vapor to fluid line 56B, which conveys the refrigerant to the economizer-side port 60 of source heat exchanger 18.

The cold mixed-phase refrigerant received at economizer-side port 60 passes through source heat exchanger 18, receiving heat $Q_3$ from working fluid circulating through source heat exchanger 18 from source S, thereby warming up to a low-pressure, superheated vapor phase refrigerant which is discharged at the valve-side port 62. Source S may be, for example, a geothermal source which is at a consistently warmer temperature than the cold refrigerant received at the economizer-side port 60. Cooled working fluid is circulated from crossflow outlet 60A, through working fluid lines 64 circulating through source S where the working fluid is warmed, and back to source heat exchanger 18 at crossflow inlet 62A. The warmed working fluid is then ready to discharge heat $Q_3$ to the cold refrigerant as noted above.

In an exemplary embodiment, the working fluid circulating through load heat exchanger 16 may be, e.g., water, while the working fluid circulating through source heat exchanger 18 may be, e.g., water, methanol, propylene glycol, or ethylene glycol.

The low-pressure, superheated vapor discharged from the valve-side port 62 of source heat exchanger 18 is conveyed via fluid line 66 to reversing valve 14, where it is allowed to pass to fluid line 68, which in turn conveys the vapor to compressor inlet 30 to be compressed for the next refrigerant cycle.

Turning now to FIG. 2, a cooling mode of air conditioning system 10 is illustrated in which refrigerant flow is substantially reversed from the heating mode of FIG. 1, and the discharge of heated vapor from economizer 20 to compressor 12 is ceased such that vapor injection functionality is operably disabled.

To reverse the refrigerant flow direction from heating to cooling mode, 4-way reversing valve 14 is toggled to the configuration of FIG. 2. Thus, as illustrated, hot superheated vapor phase refrigerant discharged from compressor outlet 28 is conveyed to the valve-side port 62 of source heat exchanger 18 via fluid line 34, valve 14, and fluid line 66. Rather than transferring heat to the conditioned space of building B via load heat exchanger 16 as shown in FIG. 1 and described in detail above, source heat exchanger 18 now serves as a condenser to extract heat from the hot vapor phase refrigerant, and deposit the extracted heat $Q_3$ at source S by thermal exchange between the refrigerant and the working fluid circulating through fluid lines 64.

Subcooled liquid exits source heat exchanger 18 at the economizer-side port 60 and passes through filter 26 as described above. The subcooled liquid then passes through primary thermal expansion valve 22, where the refrigerant is expanded to a cold vapor/liquid mixture and discharged to fluid line 50B. At fluid divider 51, no refrigerant flow passes to fluid line 52A toward economizer expansion valve 24, but rather, the entire volume of refrigerant passes from line 50B to line 50A and on to economizer 20. Thus, no fluid circulates from crossflow inlet 48A to crossflow outlet 46A of economizer 20, and therefore no substantial heat transfer occurs within economizer heat exchanger 20. Thus, the cold vapor/fluid mixture which enters economizer 20 at the source-side port 48 exits the load-side port 46 with substantially unchanged temperature, pressure and phase.

In order to stop the diversion of refrigerant flow at divider 51 and therefore effectively disable economizer 20, economizer expansion valve 24 may be adjusted to a fully closed position. This prevents fluid flow therethrough, such that no fluid passage through fluid lines 52A, 52B and 54B occurs. In an exemplary embodiment, valve 24 is an electronic expansion valve (EEV) which can be continuously adjusted between fully closed and fully opened positions, as well as any selected intermediate position. Advantageously, the use of an EEV for economizer expansion valve 24 allows controller 70 to control valve 24 automatically according to a programmed set of instructions. As described in detail below, controller 70 may automatically adjust valve 24 to a fully closed, zero-flow position when air conditioning system 10 is toggled from the heating mode to the cooling mode. However, it is contemplated that economizer expansion valve 24 may be a thermostatic expansion valve (TXV) together with a solenoid operable to separately permit or prevent flow therethrough. The thermostatic expansion valve may change the size of its fluid flow passageway responsive to pressure and/or temperature changes, while the solenoid operates as an open/closed only valve.

Referring still to FIG. 2, the lack of fluid flow through economizer expansion valve 24 also results in a lack of flow through vapor injection fluid line 54B, such that no vapor is injected at vapor injection inlet 32 of compressor 12. Accordingly, the vapor injection functionality provided in the heating mode of FIG. 1 is operably disabled and the cooling mode of FIG. 2 by the closure of expansion valve 24.

The mixed vapor/liquid phase refrigerant discharged at the load-side port 46 of economizer 20 is carried to economizer-side port 40 of load heat exchanger 16 by fluid line 44, where heat $Q_1$ is transferred to the cool vapor mixture from building B. In particular, cooled working fluid circulates from crossflow outlet 38A, through working fluid lines 42 and into building B, where the working fluid is warmed by the ambient air of building B. This warmed working fluid is carried by working fluid lines 42 back to crossflow inlet 40A of load heat exchanger 16, where the flow of the relatively colder vapor/liquid refrigerant absorbs heat $Q_1$, such that the refrigerant is converted to a superheated vapor phase by the time it is discharged at the compressor-side port 38. Fluid line 36 conveys the superheated vapor through valve 14 to fluid line 68, and then to compressor inlet 30, where the low-pressure superheated vapor is again compressed for a new refrigerant cycle.

Advantageously, the disabling of the vapor injection functionality in the cooling mode, while enabling the same in the heating mode, allows efficiency gains to be realized in a reversible heat pump system. In particular, compressor 12 operates with relatively high compression ratios in the heating mode of FIG. 1, in order to provide the requisite heat for conditioning building B by deposit of heat $Q_1$ therein. Thus, in view of the larger work load borne by compressor 12 during the heating mode, a vapor compression functionality as shown in FIG. 1 and described in detail above provides substantial increases in capacity and efficiency of air conditioning system 10. However, in the cooling mode of FIG. 2, compressor 12 may utilize lower compression ratios between inlet 30 and outlet 28 while still providing adequate removal of heat $Q_1$ from building B. At these lower compression ratios, vapor injection is unnecessary and that functionality may therefore be disabled without an efficiency penalty. Advantageously, the operable disabling of vapor injection may be accomplished entirely by controller 70 e.g., by issuing a command for economizer expansion valve 24 to fully close when reversing valve 14 to toggle from the heating to the cooling mode.

2. Variable-Speed Scroll Compressor

In an exemplary embodiment, compressor 12 is a variable speed scroll-type compressor. Scroll compressors, also known as spiral compressors, use two interleaving scrolls to pump fluid from an inlet to an outlet, such as by fixing one scroll while the other orbits eccentrically without rotating, thereby trapping and pumping or compressing pockets of fluid between the scrolls. Advantageously, the superheated vapor received at the vapor injection port may be injected to the scroll set at an intermediate point of the compression process. The size and position of these ports can be optimized to ensure maximum benefit and coefficient of performance and capacity for scroll compressor 12 at expected operating conditions for a particular application.

Figure 3:
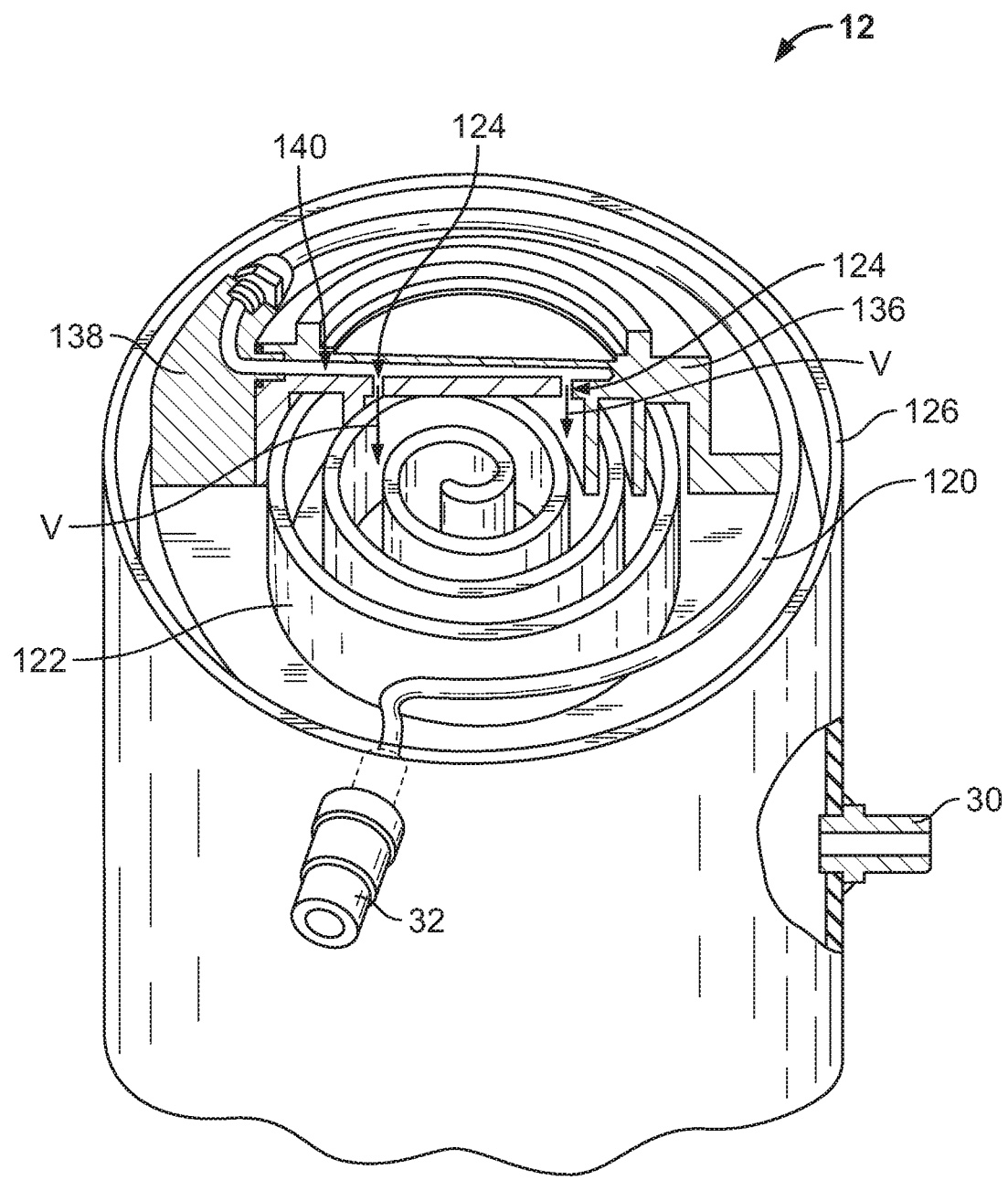
FIG. 3 is an elevation view of a scroll compressor including vapor injection in accordance with the present disclosure.

In one exemplary embodiment shown in FIG. 3, compressor 12 includes vapor injection inlet 32 on an outer surface of compressor shell 126, leading to a vapor transfer tube 120 extending into the interior of compressor 12 around scroll 122 to manifold 138. Manifold 138 delivers the vapor to vapor injection outlets 124 via lateral passageway 140 formed in stationary scroll 136. Outlets 124 may be positioned along passageway 140 at any selected location to correspond with a selected wrap of scroll 122. Outlets 124 deliver vapor V within working pockets defined between the scroll wraps which are at an intermediate pressure between the low pressure at inlet 32 (FIG. 1) and the high pressure at outlet 28 (FIG. 1). Thus, superheated vapor flowing from economizer 20 is received at vapor injection inlet 32, and is then delivered via tube 120 and outlets 124 to a desired location among the wraps of scroll 122. Advantageously, the particular location of outlets 124 among the wraps of scroll 122 can be selected for a particular application, in order to provide superheated vapor to scroll 122 at a desired location for maximum efficiency of compressor 12.

Variable speeds used in compressor 12 further allows precise matching of compressor output to the load demanded for a particular application. In the embodiment of FIG. 3, scroll 136 is a fixed scroll while moveable scroll 122 may orbited relative to scroll 136 at a variable speed to provide the variable speed function of compressor 12. In the illustrated reversible embodiment of FIGS. 1 and 2, the variable loads imposed by heating and cooling cycles (as noted above) may be met by varying the speed of compressor 12. Further, the variable-speed operation facilitates a steady ramp up and ramp down as compressor 12 changes speed, such that a refrigerant buffer tank may be kept to a minimal size.

3. Coaxial Heat Exchangers

Figure 4:
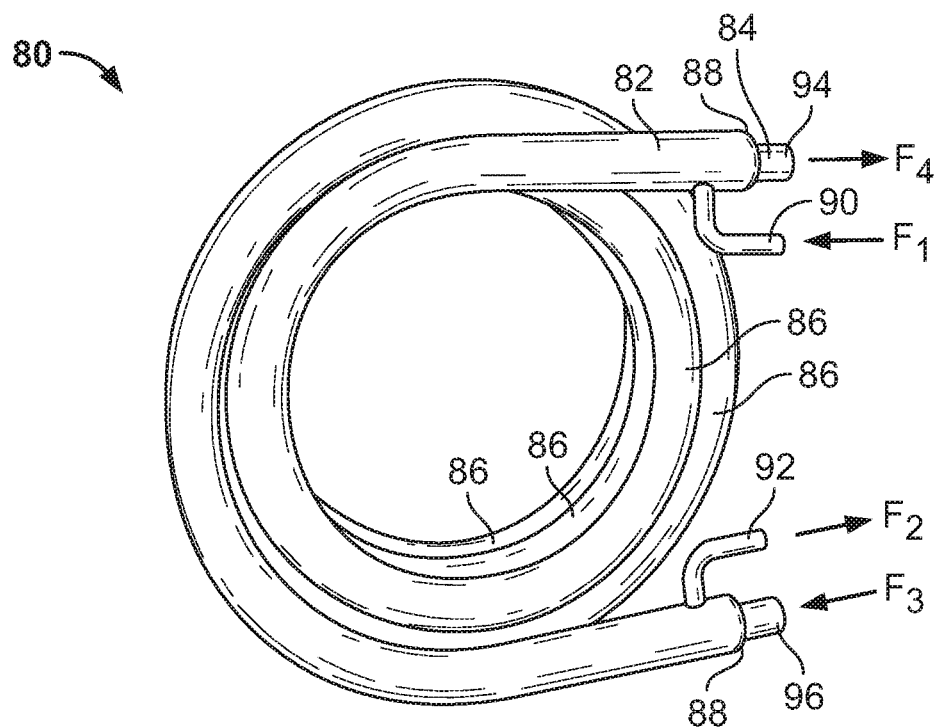
FIG. 4 is a perspective view of a coaxial heat exchanger used in the air conditioning system shown in FIG. 1.
Figure 5:
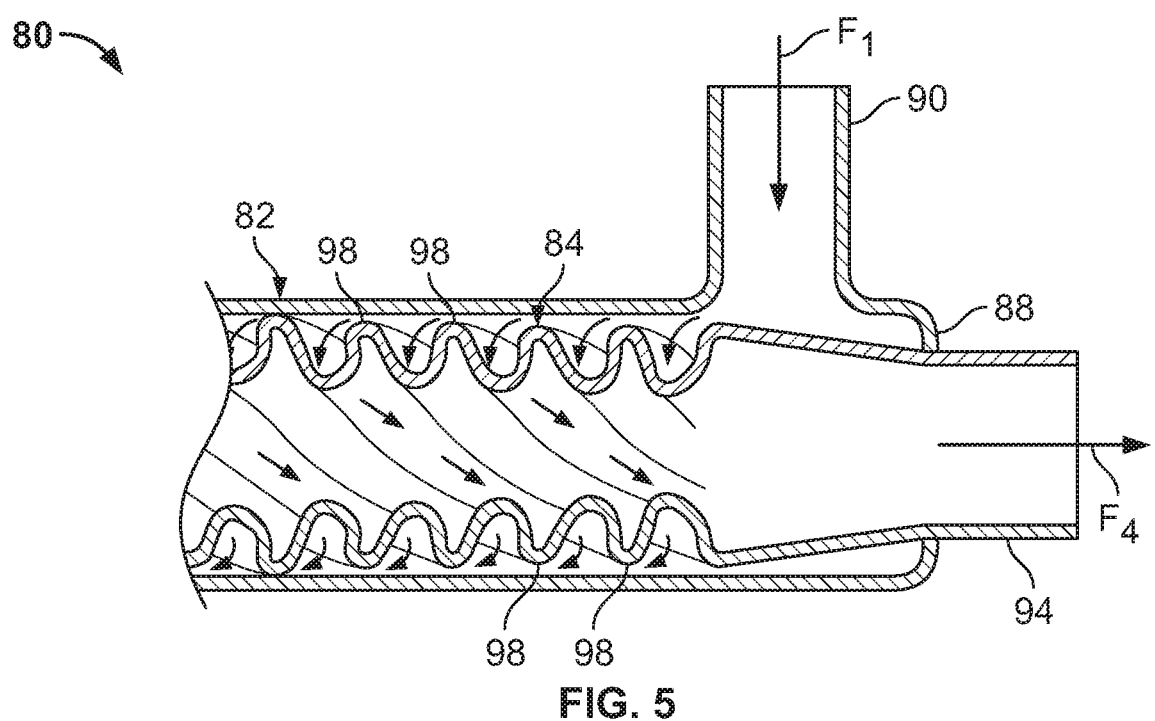
FIG. 5 is an elevation, cross-sectional view of a portion of the coaxial heat exchanger shown in FIG. 4, illustrating fluid flow therethrough.

In an exemplary embodiment, economizer 20 is a coaxial heat exchanger 80, shown in FIG. 4. Coaxial heat exchanger 80 includes outer fluid passageway 82 with a coaxial inner fluid passageway 84 received therewithin, as shown in FIG. 5. The coaxial arrangement of passageways 82 and 84 may form a plurality of coils 86 (FIG. 4) to provide a desired axial extent of passageways 82, 84 while consuming a minimal amount of physical space. Outer passageway 82 includes axial ends 88 which sealingly engage the outer surface of the adjacent inner passageway 84, and include inlet 90 and outlet 92 radially spaced from the outer surface of the main axially extending body of outer passageway 82.

An incoming flow $F_1$ is received at inlet 90, as best seen in FIG. 5, and proceeds to flow around the outer surface of inner fluid passageway 84 until reaching outlet 92 where it is discharged as outlet flow $F_2$. Similarly, an inlet flow $F_3$ flows into inner fluid passageway 84 at inlet 96, and flows along the opposite axial direction through inner passageway 84 to be discharged at outlet 94 as flow $F_4$, while remaining fluidly isolated from the flow through outer passageway 82. This "counter-flow" arrangement, in which the inlet 90 of outer fluid passageway 82 is adjacent the outlet 94 of the inner fluid passageway 84 and vice-versa, promotes maximum heat transfer between the respective working fluids by maximizing the temperature differential throughout the axial extent of coaxial heat exchanger 80. However, in some instances, one of the fluid flows may be reversed so that both working fluids travel along the same direction.

In the exemplary embodiment of FIG. 5, inner fluid passageway 84 may include a plurality of corrugations 98 arranged in a helical threadform-type pattern, which encourages the development of a twisting, turbulent flow through both outer and inner fluid passageways 82, 84. This flow ensures that the working fluids in passageways 82, 84 remain well mixed to promote thorough heat transfer between the two fluids throughout the axial extent of heat exchanger 80.

Advantageously, employing coaxial heat exchanger 80 for economizer 20 in air conditioning system 10 helps to ensure delivery of sub-cooled liquid to expansion valve 22, while also ensuring that the vapor injection flow through fluid line 54B to vapor injection port 32 (FIG. 1) is always superheated. In particular, the coaxial heat exchanger arrangement shown in FIGS. 4 and 5 provides a large amount of heat transfer between the fluid flows, thereby promoting the provision of pure superheated vapor to the vapor injection port 32 of compressor 12, which may be designed to handle only vapor such as in the case of scroll compressor 12 described above. The heat transfer enabled by economizer 20 also ensures that only subcooled liquid is provided to expansion valve 22, which may operate properly and efficiently (e.g., without "hunting" or erratic adjustment behavior) when pure liquid is delivered.

In a further exemplary embodiment, heat exchanger 80 may be designed to operate using potable water in one or both of passageways 82, 84. For example, coaxial heat exchanger 80 may also be used for load heat exchanger 16, in which the working fluid circulating through working fluid lines 42 to building B may be water designed to be delivered to the end user, such as hot water for a hot water heater which discharges to building appliances. It is also contemplated that source heat exchanger 18 may be a coaxial heat exchanger 80, designed for either potable or non-potable fluid flows.

Figure 6:
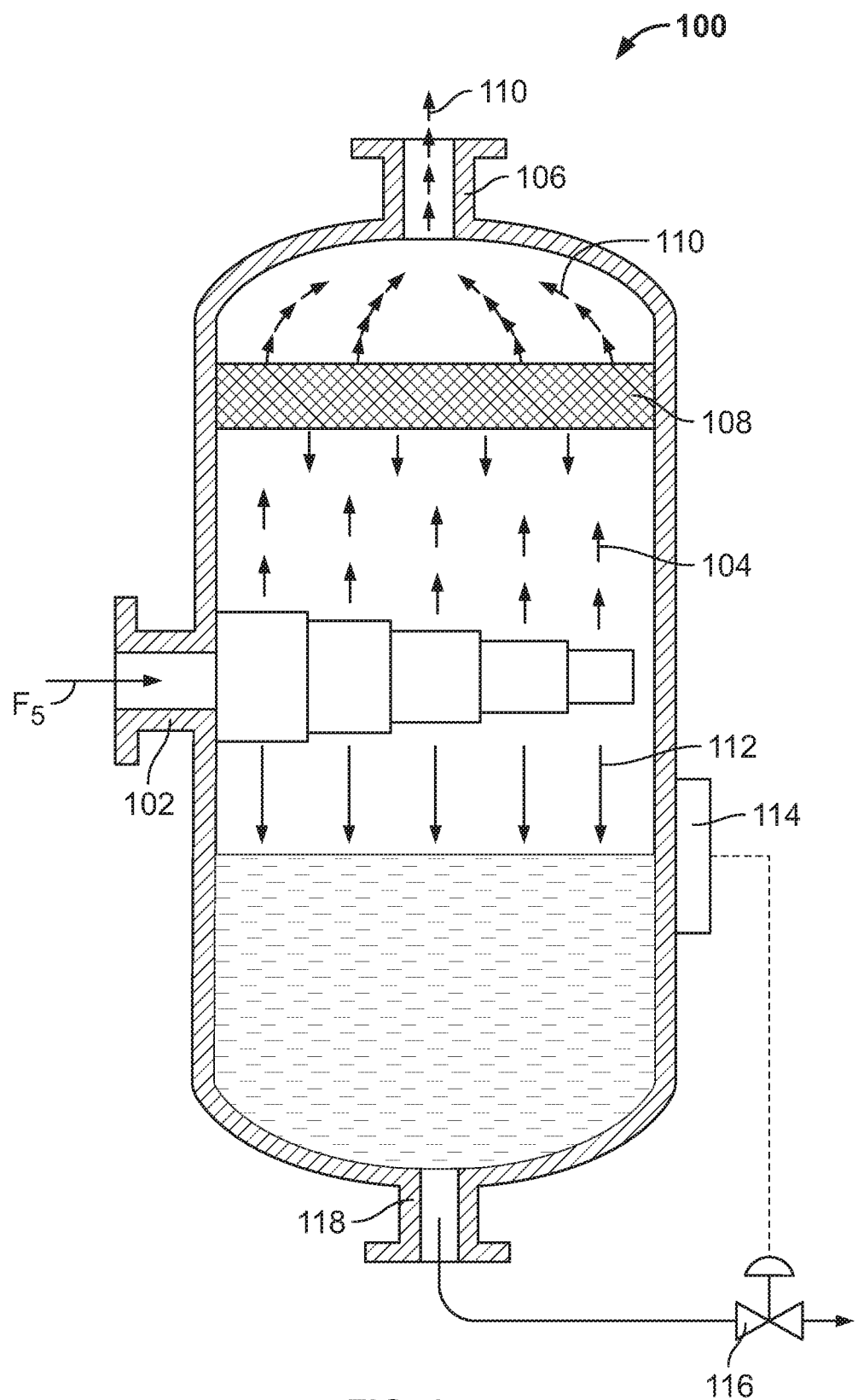
FIG. 6 is an elevation, cross-section view of a flash tank used in some air conditioning systems for separating entrained liquid from vapor.

In some instances, economizer 20 may be formed as flash tank 100, shown in FIG. 6. In this arrangement, a flow $F_5$ of refrigerant is received at inlet 102 in a mixed phase, such as a partially subcooled refrigerant of the type carried by fluid line 44 shown in FIG. 1. This refrigerant is allowed to expand or "flash" into vapor upon entry into flash tank 100. Saturated vapor 104 rises toward outlet 106, passing through a de-entrainment mesh pad 108 to remove any entrained liquid in vapor 104. This drier, but still saturated vapor 110 flows from outlet 106 to the vapor injection port of a compressor, such as inlet 32 of compressor 12 via fluid line 54B as shown in FIG. 1. Meanwhile, residual liquid 112 collects at the bottom of flash tank 100, the level of which is measured by fluid level measuring device 114. Depending on the measured level of liquid 112, a control valve 116 connected at liquid outlet 118 may be opened (to lower the level) or closed (to allow further liquid accumulation). The sub-cooled liquid 112 may be discharged to an expansion valve, such as expansion valve 22 via fluid lines 50A, 50B.

However, the provision of saturated vapor 110 to a vapor injection port of a compressor is not optimal, because in some cases such vapor may include droplets of liquid refrigerant, for which the compressor, such as scroll compressor 12, is not designed. Further, the level of liquid 112 within flash tank 100 must be controlled within a given range, and is influenced by the particular refrigerant properties received at flow $F_5$, as well as the volume of flow. Thus, flash tank 100 must be sized according to other system parameters of air conditioning system 10 in order to work properly, and the working parameters of system 10 may only be changed within a certain range without overwhelming the capacities of flash tank 100. In order to provide flexibility for reversible functionality the exemplary embodiment of air conditioning system 10 shown in FIGS. 1 and 2 utilizes coaxial heat exchanger 80 for economizer 20, rather than flash tank 100.

4. Transcritical Refrigerant

In an exemplary embodiment, the refrigerant flow used for the thermal cycle of air conditioning system 10 is R410A refrigerant. In air conditioning system 10, R410A may be used in a transcritical cycle, i.e., the refrigerant may be present in both sub-critical and super-critical states at different points along its fluid path.

For purposes of the present disclosure, a super-critical fluid is a fluid having a temperature and pressure above its critical point, at which distinct liquid and gas phases do not exist. For example, the "vapor/liquid mixture" referred to above with respect to the heating and cooling cycles shown in FIGS. 1 and 2 may be super-critical fluids. Sub-critical fluids, on the other hand, are fluids in which distinct liquid and gas phases do exist, such as subcooled liquid and superheated vapor as described in detail above with respect to the heating and cooling cycles of FIGS. 1 and 2 respectively.

Advantageously, R410A refrigerant can traverse sub-critical and super-critical states without itself changing phase, such that a higher temperature refrigerant may be utilized for more effective heat transfer at various stages of air conditioning system 10. Moreover, R410A is also widely used in homes and buildings for primary heating/cooling needs in the United States as well as elsewhere in the world, and is readily commercially available in sufficient quantity for small- or large-scale heating/cooling needs for a reasonable price. R410A is also generally accepted under local, state, and federal codes.

In some applications in accordance with the present disclosure, other refrigerant candidates may include R134a, R32, R1234ze, or blends of any of the previously mentioned refrigerants.

5. Control and Operation

In operation, controller 70 is electrically connected to compressor 12, 4-way reversing valve 14, economizer expansion valve 24 and primary expansion valve 22, as shown in FIGS. 1 and 2. In the heating mode (FIG. 1), controller 70 toggles 4-way reversing valve 14 into the illustrated configuration, opens economizer expansion valve 24 to an appropriate fluid flow capacity, and adjusts primary expansion valve 22 to produce a desired vapor mixture carried by fluid lines 56A, 56B from the expected sub-cooled liquid arriving from fluid line 50B.

Controller 70 activates compressor 12, which sets the heating cycle in motion by compelling refrigerant to pass through the various functional structures of air conditioning system 10 to effect heating in building B, as described in detail above. In an exemplary embodiment, controller 70 receives signals indicative of fluid pressures within expansion valves 22, 24, as measured by pressure sensing lines 58, 54A, respectively. Controller 70 includes a comparator which compares the pressures within pressure sensing lines 58, 54A of valves 22, 24, respectively, against a desired pressure for a particular application. This comparison results in a disparity between the desired and actual pressure, which is then compared against a threshold acceptable disparity. When the actual disparity is beyond the threshold disparity, controller 70 adjusts the fluid flow through valves 22, 24 and/or the speed of compressor 12 in order to bring the pressure within pressure sensing lines 58, 54A to a level within the desired disparity.

When it is desired to switch from the heating mode of FIG. 1 to the cooling mode of FIG. 2, controller 70 toggles 4-way reversing valve 14 from the configuration of FIG. 1 to the configuration of FIG. 2. In addition, controller 70 adjusts economizer expansion valve 24 to a fully closed position, thereby operably disabling the vapor injection feature used in the heating mode, as described in detail above. Primary expansion valve 22 may also be adjusted to the differing demands of receiving sub-cooled liquid from fluid line 56A and discharging a vapor mixture to fluid lines 50B, as described above.

Controller 70 may then activate compressor 12 in order to compel the refrigerant throughout the refrigerant circuit shown in FIG. 2 and effect cooling of building B as described above. As with the heating mode described above, controller 70 may adjust the speed of compressor 12 and/or the flow characteristics through valve 22 in order to maintain the pressure within pressure sensing line 58 in an acceptable range. Generally speaking, the desired pressure within valve 22 and line 58 is lower in the cooling mode of air conditioning system 10 as compared to the heating mode thereof. Therefore, compressor 12 is generally controlled by controller 70 to operate at a slower and/or lower power state in the cooling mode as compared to the heating mode.

6. Applications.

The present system may be used in the following particularized applications.

In an exemplary embodiment, air conditioning system 10 may be used in a geothermal system, in which source heat exchanger 18 is in heat exchange relationship with a ground source/loop 64 as a heat source/heat sink S.

Air conditioning system 10 may also be used for hot water heating for hydronic applications, such as residential or business heating systems which use water as a heat-transfer medium for heating the air inside a building. Such systems include radiant-heat applications, for example. In the exemplary embodiment of FIGS. 1 and 2, working fluid lines 42 may carry hot water to building B, deposit heat $Q_1$ therein, and recirculate to load heat exchanger 16 to be reheated.

Figure 7:
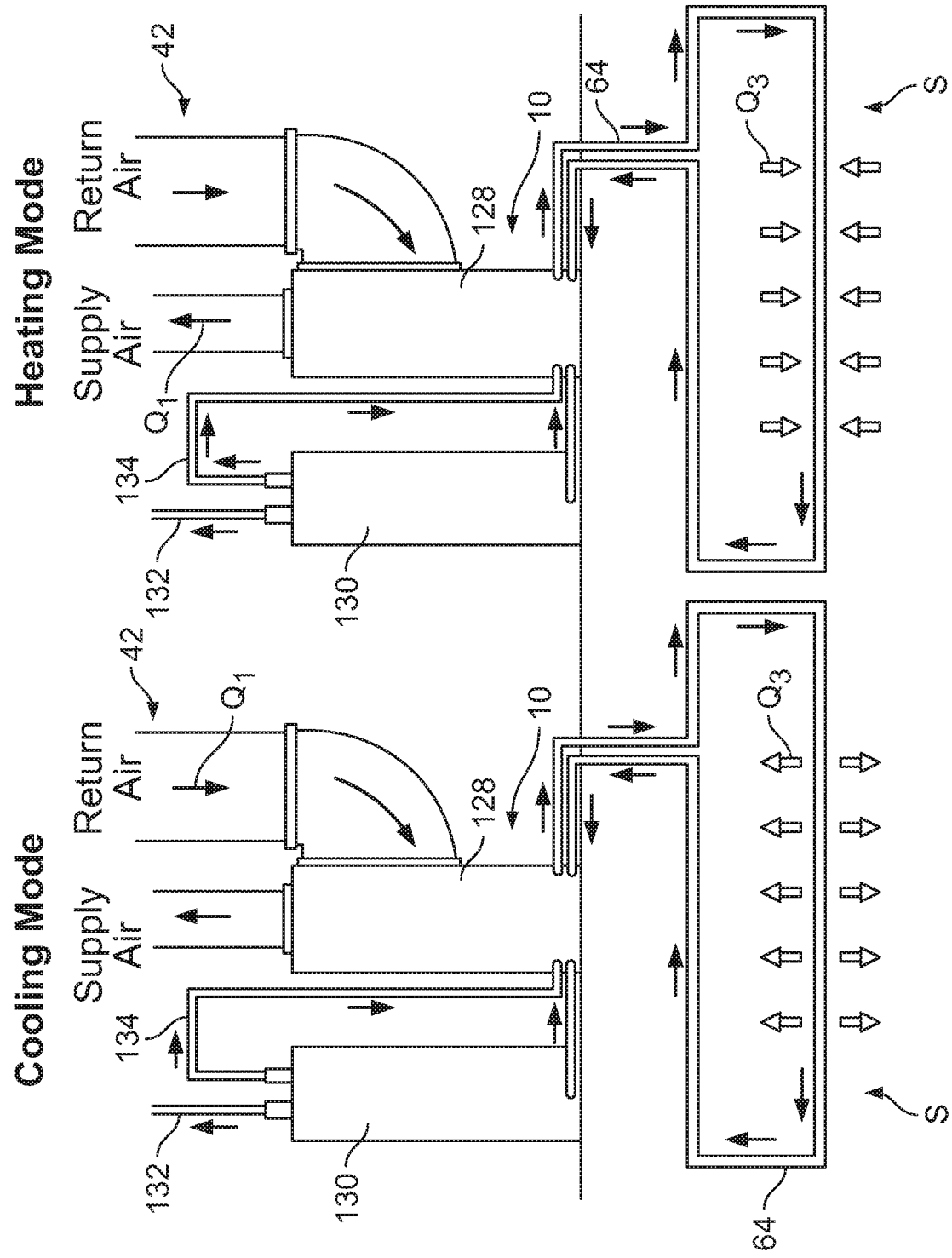
FIG. 7 is a schematic view of a geothermal air conditioning system in accordance with the present disclosure.

For example, an exemplary geothermal application of air conditioning system 10 utilized with forced-air type air conditioning is illustrated in FIG. 7. Air conditioning system 10 is contained within a single housing 128, as shown, which also includes air movers (not shown) for inducing air flow F through ducts 42 (in the forced-air context of FIG. 7, ducts are the working fluid conduits 42 of FIG. 1 and air is the working fluid). Source S is a ground source, such as an underground formation of soil, rock, water, and the like. In the cooling mode, heat $Q_3$ is deposited into the underground formation by warm working fluid circulating through fluid lines 64, and withdrawn from building B as heat $Q_1$ via ducts 42. Conversely, in the heating mode, heat $Q_3$ is withdrawn from the underground formation by cool working fluid circulating through fluid lines 64, and deposited into building B as heat $Q_1$ via ducts 42.

As noted above and illustrated in FIG. 7, air conditioning system 10 may also be used for domestic or commercial hot water heating. Such systems convey hot working fluid from air conditioning system 10 (e.g., from load heat exchanger 16) through hot water line 132 to a water heater 130 which may be located, e.g., in building B. Cool water is returned to air conditioning system 10 (e.g., back to load heat exchanger 16) via a cool water line 134 to be reheated.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A heat pump system for heating and cooling a space, comprising:
    a refrigerant circuit through which refrigerant is configured to flow;
    a variable speed compressor disposed on the refrigerant circuit, the compressor including a compressor inlet, a compressor outlet, and a vapor injection inlet disposed between the compressor inlet and the compressor outlet;
    a load heat exchanger disposed on the refrigerant circuit to exchange heat between the refrigerant and either a cooling load or a heating load;
    a source heat exchanger disposed on the refrigerant circuit to exchange heat between the refrigerant and a source;
    a reversing valve disposed on the refrigerant circuit between the compressor and the load and source heat exchangers and selectable to effect a heating mode and a cooling mode, wherein in the heating mode the reversing valve routes the refrigerant from the compressor outlet to the load heat exchanger and routes the refrigerant from the source heat exchanger to the compressor inlet, wherein in the cooling mode the reversing valve routes the refrigerant from the compressor outlet to the source heat exchanger and routes the refrigerant from the load heat exchanger to the compressor inlet;
    a diverter disposed on the refrigerant circuit between the load heat exchanger and the source heat exchanger, the diverter configured to divert a portion of the refrigerant to an economizer circuit when the heat pump system is in the heating mode and none of the refrigerant when the heat pump system is in the cooling mode, wherein the economizer circuit includes:
        an economizer heat exchanger configured to exchange heat between the refrigerant diverted to the economizer circuit and the refrigerant in the refrigerant circuit to create superheated refrigerant vapor for injection into the vapor injection inlet, and
        an electronic economizer expansion valve (EEEV) disposed between the diverter and the economizer heat exchanger, the EEEV configured to selectively meter and expand the diverted refrigerant when the heat pump system is in the heating mode and the economizer circuit is active and to selectively cease diversion of the refrigerant to the economizer circuit when the heat pump system is in the cooling mode;
    an electronic primary expansion valve (EPEV) disposed on the refrigerant circuit between the diverter and the source heat exchanger to selectively meter the refrigerant discharged from the economizer heat exchanger to the source heat exchanger when the heat pump system is in the heating mode and the economizer circuit is active and to selectively meter the refrigerant discharged from the source heat exchanger to the economizer heat exchanger when the heat pump system is in the cooling mode and the economizer circuit is inactive; and
    a controller operable to control the reversing valve, the EEEV, and the EPEV,
    wherein in the heating mode, the EPEV receives the refrigerant from the economizer heat exchanger and discharges the refrigerant to the source heat exchanger,
    wherein in the cooling mode, the EPEV receives the refrigerant from the source heat exchanger and discharges the refrigerant to the economizer heat exchanger.

2. The heat pump system of claim 1, wherein the controller is configured to control the EEEV to meter the diverted refrigerant to the economizer heat exchanger.

3. The heat pump system of claim 1, wherein the controller is operable to
    toggle the reversing valve to effect the heating mode and adjustably open the EEEV when the heat pump system is called upon to deposit heat into a conditioned space; and
    toggle the reversing valve to effect the cooling mode and close the EEEV to a fully closed position when the heat pump system is called upon to withdraw heat from the conditioned space.

4. The heat pump system of claim 1, wherein the economizer heat exchanger comprises:
    a first flow path through which the refrigerant in the refrigerant circuit passes; and
    a second flow path through which the refrigerant diverted to the economizer circuit passes, the second flow path coaxial with, but fluidly isolated from, the first flow path such that the first flow path is in heat exchange relationship with the second flow path.

5. The heat pump system of claim 1, wherein the variable speed compressor is a variable speed scroll compressor.

6. The heat pump system of claim 1, wherein at least one of the load heat exchanger and the source heat exchanger comprises:
    a first flow path through which the refrigerant passes; and
    a second flow path through which a first or second working fluid passes, respectively, the second flow path coaxial with, but fluidly isolated from, the first flow path such that the first flow path is in heat exchange relationship with the second flow path.

7. The heat pump system of claim 1, further comprising a refrigerant filter/dryer disposed on the refrigerant circuit between the source heat exchanger and the EPEV.

8. The heat pump system of claim 1, wherein the controller is operable to
    compare a detected refrigerant pressure at the EPEV to a desired refrigerant pressure and compute a pressure difference, and
    if the pressure difference is beyond a threshold amount, adjust at least one of a speed of the compressor and a flow rate of the refrigerant through the EPEV to return the pressure difference to an amount less than the threshold amount.

9. The heat pump system of claim 1, wherein the controller controls the compressor to operate at a slower speed in the cooling mode than in the heating mode.

10. The heat pump system of claim 1, wherein the load heat exchanger heats or cools potable water.

11. The heat pump system of claim 1, wherein the controller is operable to
    compare a detected refrigerant pressure at the EEEV to a desired refrigerant pressure and compute a pressure difference, and
    if the pressure difference is beyond a threshold amount, adjust at least one of a speed of the compressor and a flow rate of the diverted refrigerant through the EEEV to return the pressure difference to an amount less than the threshold amount.

12. The heat pump system of claim 1, wherein the refrigerant is R410A and the heat pump system operates the refrigerant in sub-critical and super-critical states.

13. The heat pump system of claim 1, wherein the source is a geothermal source, and a working fluid circulates between the source heat exchanger and the geothermal source to exchange heat between the refrigerant and the geothermal source.

14. A method of controlling a heat pump system, comprising:
toggling a reversing valve to effect one of a heating mode and a cooling mode, the reversing valve being disposed on a refrigerant circuit between a variable speed compressor disposed on the refrigerant circuit, a load heat exchanger disposed on the refrigerant circuit to exchange heat between a refrigerant and either a heating load or a cooling load, and a source heat exchanger disposed on the refrigerant circuit to exchange heat between the refrigerant and a source;
determining a first refrigerant pressure in a first pressure sensing line fluidly connecting an electronic economizer expansion valve (EEEV) to a vapor injection inlet of the compressor;
controlling the EEEV based on the first refrigerant pressure, the EEEV being configured to selectively divert a portion of the refrigerant from the refrigerant circuit to an economizer heat exchanger, the EEEV being disposed on an economizer circuit between a diverter and the economizer heat exchanger, the diverter being disposed on the refrigerant circuit, the economizer heat exchanger being configured to exchange heat between the refrigerant diverted to the economizer circuit and the refrigerant in the refrigerant circuit to create superheated refrigerant vapor for injection into the vapor injection inlet of the compressor, including:
in the heating mode, adjusting the EEEV to meter and expand the diverted refrigerant, and
in the cooling mode, fully closing the EEEV to cease diversion of the refrigerant; and
determining a second refrigerant pressure in a second pressure sensing line fluidly connecting an electronic primary expansion valve (EPEV) to a compressor inlet;
controlling the EPEV based on the second refrigerant pressure, the EPEV being configured to selectively meter and expand the refrigerant, the EPEV being disposed on the refrigerant circuit between the diverter and the source heat exchanger, including:
in the heating mode, metering the refrigerant discharged from an active economizer heat exchanger to the source heat exchanger, and
in the cooling mode, metering the refrigerant discharged from the source heat exchanger to an inactive economizer heat exchanger; and
controlling a speed of the compressor based on the first and second refrigerant pressures to circulate the refrigerant through the load heat exchanger, the economizer heat exchanger, the source heat exchanger, and the EPEV to match compressor output to the heating load and the cooling load.

15. The method of claim 14, wherein toggling the reversing valve, controlling the EEEV, controlling the EPEV, and controlling the speed of the compressor are performed by an electronic controller.

16. The method of claim 15, wherein in the heating mode the controller
compares the first refrigerant pressure with a desired first refrigerant pressure at the EEEV to generate a first pressure differential;
compares the first pressure differential with a first predetermined threshold pressure differential; and
adjusts at least one of the speed of the compressor and a flow rate of the diverted refrigerant when the first pressure differential is outside the first predetermined threshold pressure differential.

17. The method of claim 15, wherein in the heating mode and in the cooling mode the controller
compares the second refrigerant pressure with a desired second refrigerant pressure at the EPEV to generate a second pressure differential;
compares the second pressure differential with a second predetermined threshold pressure differential; and
adjusts at least one of the speed of the compressor and a flow rate of the refrigerant through the EPEV when the second pressure differential is outside the second predetermined threshold pressure differential.

18. The method of claim 15, wherein in the heating mode the controller controls at least one of the speed of the compressor, a flow rate of the refrigerant through the EPEV, and a flow rate of the diverted refrigerant through the EEEV to maintain the refrigerant in a mixed liquid-and-vapor phase state between the EEEV and the economizer heat exchanger and between the EPEV and the source heat exchanger.

19. The method of claim 15, wherein in the cooling mode the controller controls at least one of the speed of the compressor and a flow rate of the refrigerant through the EPEV to maintain the refrigerant in a mixed liquid-and-vapor phase state between the EPEV and the load heat exchanger.

20. The method of claim 15, wherein in the heating mode the controller controls at least one of the speed of the compressor, a flow rate of the refrigerant through the EPEV, and a flow rate of the refrigerant through the EEEV to maintain the refrigerant in a superheated vapor phase between the load heat exchanger and the compressor, and to maintain the refrigerant in a subcooled liquid phase between the economizer heat exchanger and the EPEV.

21. The system of claim 1, wherein the EEEV is configured to be continuously adjustable between fully open and fully closed positions, wherein when the heat pump system is in the heating mode and the economizer circuit is inactive the EEEV is closed.

* * * * *